United States Patent
Miki

(10) Patent No.: US 9,325,001 B2
(45) Date of Patent: Apr. 26, 2016

(54) COMPOSITE ACTIVE MATERIAL, METHOD FOR PRODUCING COMPOSITE ACTIVE MATERIAL, AND BATTERY

(75) Inventor: Nariaki Miki, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 495 days.

(21) Appl. No.: 13/981,990

(22) PCT Filed: Feb. 2, 2011

(86) PCT No.: PCT/JP2011/052139
§ 371 (c)(1),
(2), (4) Date: Jul. 26, 2013

(87) PCT Pub. No.: WO2012/105009
PCT Pub. Date: Aug. 9, 2012

(65) Prior Publication Data
US 2013/0316237 A1    Nov. 28, 2013

(51) Int. Cl.
H01M 4/36     (2006.01)
H01M 4/04     (2006.01)
H01M 4/505    (2010.01)
H01M 4/525    (2010.01)

(52) U.S. Cl.
CPC ............ *H01M 4/366* (2013.01); *H01M 4/0402* (2013.01); *H01M 4/364* (2013.01); *H01M 4/505* (2013.01); *H01M 4/525* (2013.01); *Y02E 60/122* (2013.01); *Y02P 70/54* (2015.11)

(58) Field of Classification Search
CPC combination set(s) only.
See application file for complete search history.

(56) References Cited

U.S. PATENT DOCUMENTS

| 6,589,696 | B2 * | 7/2003 | Matsubara | H01M 2/32 429/218.1 |
| --- | --- | --- | --- | --- |
| 6,881,520 | B1 * | 4/2005 | Li | H01M 4/362 429/218.1 |
| 6,902,845 | B2 * | 6/2005 | Tani | H01M 4/0416 429/218.1 |
| 2002/0009646 | A1 | 1/2002 | Matsubara et al. | |
| 2002/0164479 | A1 | 11/2002 | Matsubara et al. | |
| 2005/0048367 | A1 | 3/2005 | Igaki et al. | |
| 2005/0074672 | A1 | 4/2005 | Matsubara et al. | |
| 2006/0008706 | A1 | 1/2006 | Yamaguchi et al. | |
| 2006/0134516 | A1 | 6/2006 | Im et al. | |
| 2006/0237697 | A1 * | 10/2006 | Kosuzu | H01M 4/134 252/500 |
| 2008/0116423 | A1 * | 5/2008 | Fan | H01B 1/122 252/502 |
| 2009/0081554 | A1 * | 3/2009 | Takada | H01M 4/13 429/322 |
| 2009/0111020 | A1 * | 4/2009 | Yamaguchi | H01M 4/134 429/207 |

(Continued)

FOREIGN PATENT DOCUMENTS

| JP | 11-007942 | * | 1/1999 | H01M 4/02 |
| --- | --- | --- | --- | --- |
| JP | A-2000-212455 | | 8/2000 | |

(Continued)

*Primary Examiner* — Ula C Ruddock
*Assistant Examiner* — Amanda Barrow
(74) *Attorney, Agent, or Firm* — Oliff PLC

(57) ABSTRACT

The problem of the present invention is to provide a composite active material, which may restrain cracking and peeling of a coating layer, when the composite active material having an active material and the coating layer for coating the surface thereof is kneaded. The present invention solves the above-mentioned problem by providing a composite active material including an active material and a coating layer for coating the surface of the above-mentioned active material, in which microparticles are disposed on the surface thereof, characterized in that the above-mentioned microparticles have a smaller particle diameter than the particle diameter of the active material, and contain Si.

7 Claims, 6 Drawing Sheets

(56) References Cited

U.S. PATENT DOCUMENTS

| | | | | |
|---|---|---|---|---|
| 2009/0117472 A1* | 5/2009 | Iwamoto | ............... | H01M 4/131 429/246 |
| 2009/0162750 A1 | 6/2009 | Kawakami et al. | | |
| 2010/0310939 A1* | 12/2010 | Yoshida | ................ | H01M 4/366 429/231.8 |
| 2011/0045348 A1* | 2/2011 | Kubo | ...................... | H01M 4/36 429/209 |
| 2012/0196186 A1* | 8/2012 | Richard | ................. | H01M 4/62 429/231.6 |

FOREIGN PATENT DOCUMENTS

| | | | | | |
|---|---|---|---|---|---|
| JP | 2001-015115 | * | 1/2001 | .............. | H01M 4/62 |
| JP | 2001-210375 | * | 8/2001 | ............ | H01M 10/40 |
| JP | A-2001-210375 | | 8/2001 | | |
| JP | A-2002-8652 | | 1/2002 | | |
| JP | A-2002-260658 | | 9/2002 | | |
| JP | 2003-059492 | * | 2/2003 | .............. | H01M 4/62 |
| JP | A-2005-63953 | | 3/2005 | | |
| JP | A-2005-108774 | | 4/2005 | | |
| JP | A-2006-49266 | | 2/2006 | | |
| JP | 2006-120437 | * | 5/2006 | ............ | H01M 10/36 |
| JP | A-2006-173121 | | 6/2006 | | |
| JP | A-2007-109549 | | 4/2007 | | |
| JP | A-2008-186732 | | 8/2008 | | |
| JP | A-2008-226741 | | 9/2008 | | |
| JP | A-2009-164104 | | 7/2009 | | |
| WO | WO 2006/027925 | * | 3/2006 | .............. | B60K 8/00 |
| WO | WO 2007/004590 A1 | | 1/2007 | | |
| WO | WO 2009/133443 | * | 11/2009 | .............. | H01M 4/36 |

* cited by examiner

GENERATED MICROPARTICLES

COMPOSITE ACTIVE MATERIAL, METHOD FOR PRODUCING COMPOSITE ACTIVE MATERIAL, AND BATTERY

TECHNICAL FIELD

The present invention relates to a composite active material comprising an active material and a coating layer for coating the surface thereof, and specifically to the composite active material, which may restrain cracking and peeling of the coating layer when the composite active material is kneaded.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

In the field of such a lithium battery, the intention of improving the performance of the battery is attempted while noticing an interface between an active material and an electrolyte material. For example, in Patent Literature 1, it is disclosed that the cathode active material surface of an all solid lithium battery is coated with a lithium ion conductive oxide to restrain a high-resistance layer from being formed at an interface between the cathode active material and a sulfide solid electrolyte.

On the other hand, for example, various methods are known as a method for producing composite particles such as a cathode active material whose surface is coated with the above-mentioned lithium ion conductive oxide. For example, in Patent Literature 2, it is disclosed that an active material and carbon are mixed by a mechano-fusion method and subjected to electrification sintering to produce electrode composite powder with high electrical conductivity; in Patent Literature 3, a method for producing composite particles with an average particle diameter of 5 to 200 µm, containing microparticles with an average particle diameter of 500 nm or less, is disclosed.

CITATION LIST

Patent Literature

Patent Literature 1: WO 2007/004590 A
Patent Literature 2: Japanese patent Application Publication (JP-A) No. 2008-226741
Patent Literature 3: JP-A No. 2000-212455

SUMMARY OF INVENTION

Technical Problem

As described in Patent Literature 1, the formation of a coating layer on the surface of the active material allows the active material and the electrolyte material to be restrained from reacting; yet, for example, in the case of producing a battery by using such an active material, shear force is applied on the active material surface in mixing with another material to bring a risk that the coating layer is cracked and peeled off the active material. The present invention has been made in view of the above-mentioned actual circumstances, and the main object thereof is to provide a composite active material, which may restrain cracking and peeling of a coating layer, when the composite active material having an active material and the coating layer for coating the surface thereof is kneaded.

Solution to Problem

In order to solve the above-mentioned problems, the present invention provides a composite active material comprising an active material and a coating layer for coating the surface of the above-mentioned active material, in which microparticles are disposed on the surface thereof, characterized in that the above-mentioned microparticles have a smaller particle diameter than the particle diameter of the above-mentioned active material, and contain Si.

According to the present invention, microparticles whose particle diameter is smaller than the active material are disposed on the surface of the coating layer for coating the surface of the active material; therefore, for example, in kneading a mixture to be produced, the contact when the composite active material collides with each other becomes point contact to allow contact area to be decreased. Thus, shear force applied to the coating layer is decreased to allow the coating layer to be restrained from being cracked and peeled off the active material.

In the above-mentioned invention, the above-mentioned coating layer may have: a foundation coating layer for coating the surface of the above-mentioned active material and contains Si; and a microparticle fixed layer for fixing the above-mentioned microparticles and continuously formed on the above-mentioned foundation coating layer.

In the above-mentioned invention, the above-mentioned coating layer may be a monolayer in which the above-mentioned microparticles contact with the above-mentioned active material.

Also, the present invention provides a method for producing a composite active material comprising an active material and a coating layer for coating the surface of the above-mentioned active material, in which microparticles are disposed on the surface thereof, such that the above-mentioned microparticles have a smaller particle diameter than the particle diameter of the above-mentioned active material, and contain Si, characterized in that the method comprises a coating layer forming step of coating a coating liquid for forming a coating layer, containing Si, on the above-mentioned active material to form the above-mentioned coating layer.

The present invention allows the composite active material, which can restrain cracking and peeling of the coating layer by simple processes.

In the above-mentioned invention, the above-mentioned coating layer forming step may have: a foundation coating layer forming treatment for coating the above-mentioned coating liquid for forming a coating layer after completing hydrolysis and before starting polymerization on the surface of the above-mentioned active material to form the foundation coating layer for coating the surface of the above-mentioned active material, containing Si; and a microparticle fixed layer forming treatment for coating the above-mentioned coating liquid for forming a coating layer after starting polymerization on the above-mentioned foundation coating layer to form the microparticle fixed layer for fixing the above-mentioned microparticles on the above-mentioned foundation coating layer, in which the microparticle fixed layer forming treatment is continuously performed after the above-mentioned foundation coating layer forming treatment.

In the above-mentioned invention, the above-mentioned coating layer forming step may have a coating layer forming treatment for coating the above-mentioned coating liquid for forming a coating layer on the surface of the above-mentioned active material simultaneously with or after starting polymerization of the above-mentioned coating liquid for forming a coating layer to form the above-mentioned coating layer of a monolayer in which the above-mentioned microparticles contact with the above-mentioned active material.

Also, the present invention provides a battery comprising a cathode active material layer containing a cathode active material, an anode active material layer containing an anode active material, and an electrolyte layer formed between the above-mentioned cathode active material layer and the above-mentioned anode active material layer, characterized in that at least one of the above-mentioned cathode active material layer and the above-mentioned anode active material layer contains the above-mentioned composite active material.

According to the present invention, the use of the above-mentioned composite active material allows the coating layer to be restrained from being cracked and peeled off the active material in producing the battery. As a result, the coating layer allows the active material and the electrolyte material to be effectively restrained from reacting, and allows the battery excellent in output characteristics.

Advantageous Effects of Invention

The present invention produces the effect such as to allow cracking and peeling of a coating layer to be restrained when a composite active material comprising an active material and the coating layer for coating the surface thereof is kneaded.

DESCRIPTION OF EMBODIMENTS

A composite active material, a method for producing a composite active material and a battery of the present invention are hereinafter described in detail.

A. Composite Active Material

First, a composite active material of the present invention is described. The composite active material of the present invention comprises an active material and a coating layer for coating the surface of the above-mentioned active material, in which microparticles are disposed on the surface thereof, characterized in that the above-mentioned microparticles have a smaller particle diameter than the particle diameter of the above-mentioned active material, and contain Si.

According to the present invention, microparticles whose particle diameter is smaller than the active material are disposed on the surface of the coating layer for coating the surface of the active material; therefore, for example, in kneading the composite active material with another material, the contact when the composite active material collides with each other becomes point contact to allow contact area to be decreased. Thus, shear force applied to the coating layer is decreased to allow the coating layer to be restrained from being cracked and peeled off the active material.

Figure 1:
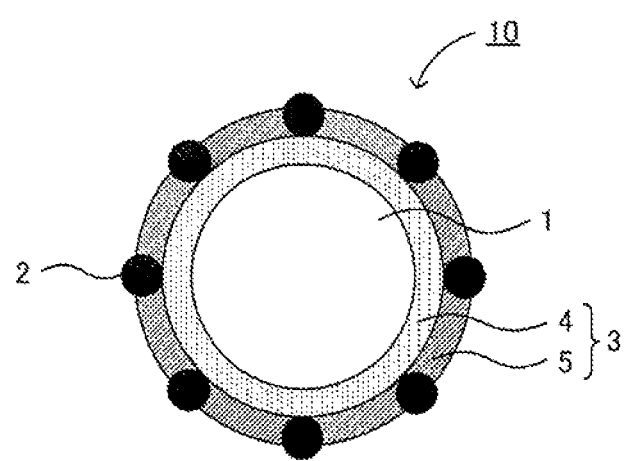
FIG. 1 is a schematic cross-sectional view showing an example of a composite active material of the present invention.

FIG. 1 is a schematic cross-sectional view showing an example of the composite active material of the present invention. A composite active material 10 shown in FIG. 1 comprises an active material 1 and a coating layer 3 for coating the surface of the active material 1, in which microparticles 2 are disposed on the surface thereof. Here, the microparticles 2 have a smaller particle diameter than the particle diameter of the active material 1, and contain Si. Also, in FIG. 1, the coating layer 3 has a foundation coating layer 4 for coating the surface of the active material 1, containing Si, and a microparticle fixed layer 5 for fixing the microparticles 2, formed on the foundation coating layer 4.

The composite active material of the present invention is hereinafter described in each constitution.

1. Coating Layer

First, a coating layer in the present invention is described. The coating layer in the present invention coats the surface of the active material, in which microparticles are disposed on the surface thereof. In the present invention, microparticles are disposed on the surface of the coating layer; therefore, for example, the contact of the composite active material with each other or the composite active material with the wall of an apparatus is made into point contact to allow contact area to be decreased. Also, the coating of the surface of the active material with the coating layer allows the active material and the electrolyte material to be restrained from reacting, and allows a high-resistance layer to be restrained from being formed at an interface between the active material and a sulfide solid electrolyte material, for example.

The coating layer in the present invention may be divided into two aspects of an aspect such as to have a foundation coating layer for coating the surface of the active material, containing Si, and a microparticle fixed layer for fixing the microparticles, formed on the foundation coating layer (a first aspect); and an aspect such as to be a monolayer in which the microparticles contact with the active material (a second aspect). Each of the aspects is hereinafter described.

(1) First Aspect

The first aspect of the coating layer in the present invention is an aspect such as to have the foundation coating layer for coating the surface of the active material, containing Si, and the microparticle fixed layer for fixing the microparticles, formed on the foundation coating layer. As shown in the above-mentioned FIG. 1, the coating layer 3 has the foundation coating layer 4 for coating the surface of the active material 1, containing Si, and the microparticle fixed layer 5 for fixing the microparticles 2, formed on the foundation coating layer 4.

The foundation coating layer in the present aspect coats the surface of the active material, and contains Si. The foundation coating layer allows the active material and the electrolyte material to be restrained from reacting. The foundation coating layer is not particularly limited if the layer contains Si and allows the active material and the electrolyte material to be restrained from reacting, but is preferably such as to have ion conductivity. The reason therefor is that the conduction of ions inside the foundation coating layer allows resistance on the surface of the active material to be decreased. Examples of a material for such a foundation coating layer include an Si-containing ion conductive oxide, an Si-containing ion conductive sulfide and an Si-containing ion conductive polymer; above all, an Si-containing ion conductive oxide is preferable. The reason therefor is that reactivity with oxide cathode active materials useful for a battery, such as $LiCoO_2$ and $LiNi_{1/3}Co_{1/3}Mn_{1/3}O_2$, is low. In the case where the composite active material having the coating layer of the present aspect is used for a lithium battery, examples of the Si-containing ion conductive oxide include $Li_4SiO_4$ and $Li_2SiO_3$. Also, the foundation coating layer may include a composite compound of the Si-containing ion conductive oxide and an ion conductive oxide containing no Si. In the case where the composite active material having the coating layer of the present aspect is used for a lithium battery, examples of the ion conductive oxide containing no Si include $Li_3PO_4$, $Li_3BO_3$, $Li_2SO_4$, $LiBO_2$, $LiPO_3$, $LiWO_4$, $Li_2MoO_4$, $Li_2ZrO_3$, $Li_2AlO_3$, $Li_2TiO_3$, $Li_4Ti_5O_{12}$, LATP, LAGP and LiPON. Specific examples of such a composite compound include $Li_4SiO_4$—$Li_3BO_3$ and $Li_4SiO_4$—$Li_3PO_4$. Incidentally, $Li_4SiO_4$ may be synthesized by using a raw material composition containing the after-mentioned Si alkoxide and Li ion source compound.

The thickness of the foundation coating layer is preferably a thickness such as not to cause the active material and the electrolyte material to react; for example, preferably within a range of 1 nm to 500 nm, and more preferably within a range of 2 nm to 100 nm. The reason therefor is that the above-mentioned range allows the active material and the electrolyte material such as a sulfide solid electrolyte material to be effectively restrained from reacting. Also, the foundation coating layer preferably coats more areas of the surface of the active material, and more preferably coats the whole surface of the active material. Specifically, the coverage factor is preferably 40% or more, more preferably 70% or more, and far more preferably 90% or more. Incidentally, examples of a measuring method for the thickness of the foundation coating layer include TEM, and examples of a measuring method for the coverage factor of the foundation coating layer include TEM and XPS.

Also, examples of a forming method for the foundation coating layer include a method for performing a foundation coating layer forming treatment described in the after-mentioned "B. Method for producing composite active material 1. Coating layer forming step (1) First aspect".

The microparticle fixed layer in the present aspect is formed on the above-mentioned foundation coating layer, and fixes the microparticles. The microparticle fixed layer makes the contact of the composite active material into point contact at the microparticle apex; therefore, for example, contact area with the wall of an apparatus and another active material may be decreased to allow shear force applied to the active material during mixing and dispersion processes to be decreased and allow cracking and peeling of the foundation coating layer to be restrained. Also, the microparticle fixed layer allows the active material and the electrolyte material to be restrained from reacting, similarly to the foundation coating layer.

The microparticles in the present aspect are fixed in the microparticle fixed layer, have a smaller particle diameter than the particle diameter of the active material, and contain Si. In the present aspect, even though force such as compression and shear is applied, the microparticles do not drop out of the microparticle fixed layer by reason of being buried in the microparticle fixed layer. Incidentally, the above-mentioned microparticles may be disposed so that at least a part thereof projects from the surface of the microparticle fixed layer, or included inside the microparticle fixed layer. Above all, the above-mentioned microparticles are preferably disposed so that a part thereof projects from the surface of the microparticle fixed layer and contacts with the foundation coating layer.

The microparticles in the present aspect contain Si and ordinarily contain O further, and is specifically a polymer obtained by the following reaction formula (1) and reaction formula (2). Incidentally, in the formulae, R denotes an organic functional group. This polymer becomes $SiO_2$ finally through hydrolysis reaction (reaction formula (1)) and polymerization reaction (reaction formula (2)) while using Si alkoxide as a starting material, so that the above-mentioned microparticles ordinarily include $SiO_2$ and occasionally contain the above-mentioned R by reason of the generating process. Examples of the above-mentioned R include —$C_2H_5$, —$CH_3$ and —$C_3H_7$.

[Chemical Formula 1]

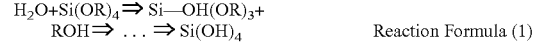

Reaction Formula (1)

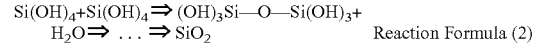

Reaction Formula (2)

The particle diameter of the microparticles is not particularly limited if the diameter is smaller than the particle diameter of the active material, but preferably within a range of 2 nm to 500 nm, and more preferably within a range of 5 nm to 100 nm, for example.

The microparticle fixed layer is ordinarily the same as the foundation coating layer in constituent element. However, the composition of the microparticle fixed layer is conceived to shift from the composition of the foundation coating layer in accordance with the formation of the microparticles. In the present aspect, the microparticle fixed layer and the foundation coating layer are the same in constituent element, so that the affinity between the microparticle fixed layer and the foundation coating layer may be improved.

Figure 2A:
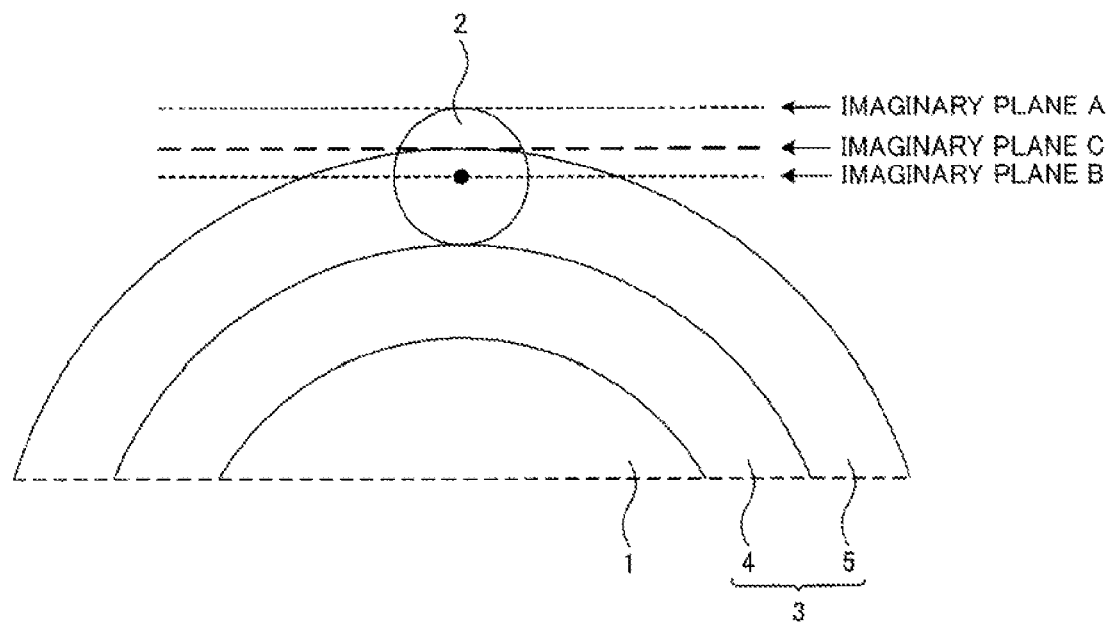
FIGS. 2A and 2B are each an explanatory view explaining an example of a microparticle fixed layer in a composite active material of the present invention.
Figure 2B:
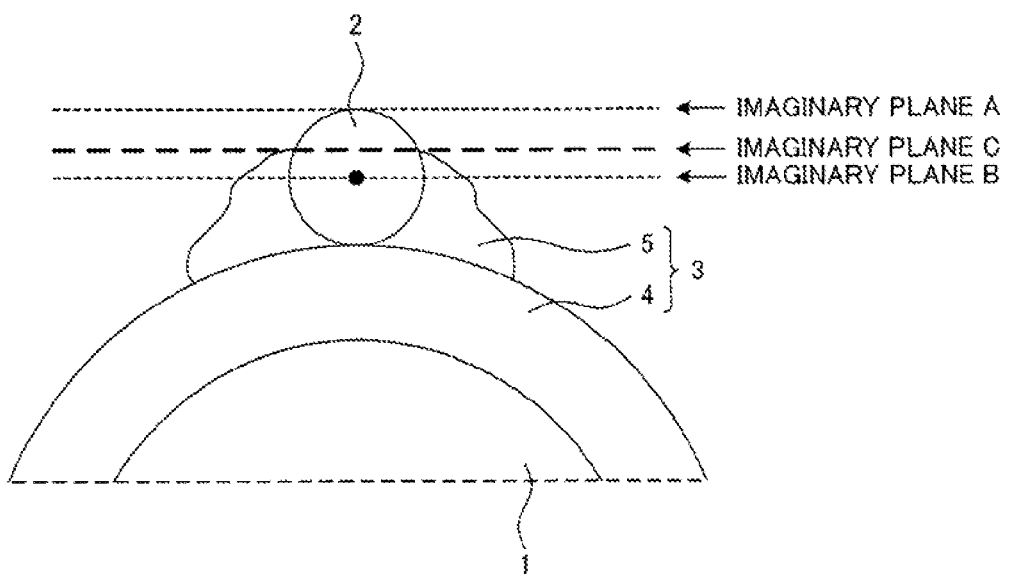

The microparticle fixed layer may be formed on the whole surface of the active material coated with the foundation coating layer, or formed on a part thereof. As exemplified in FIG. 2A, in the case where the microparticle fixed layer 5 is formed on the whole surface, when an imaginary plane including the apex of the microparticles 2 (the farthest side from the active material 1) is regarded as A and an imaginary plane including the center of gravity of the microparticles 2 is regarded as B, an imaginary plane C including a tangential line (a tangential circle) of the microparticles 2 and the microparticle fixed layer 5 exists between the imaginary plane A and the imaginary plane B. On the other hand, as exemplified in FIG. 2B, the case where the microparticle fixed layer 5 is formed on a part thereof is also the same. Incidentally, FIGS. 2A and 2B are each an explanatory view explaining an example of the microparticle fixed layer in the composite active material having the coating layer of the first aspect, and reference numerals not described in FIGS. 2A and 2B are the same as FIG. 1.

The thickness of the microparticle fixed layer is, for example, preferably within a range of 1 nm to 250 nm, and more preferably within a range of 3 nm to 50 nm. Incidentally, examples of a measuring method for the thickness of the microparticle fixed layer include TEM.

Examples of a forming method for the microparticle fixed layer include a method for performing a microparticle fixed layer forming treatment described in the after-mentioned "B. Method for producing composite active material 1. Coating layer forming step (1) First aspect". In the present aspect, in particular, it is preferable that the foundation coating layer is formed by a foundation coating layer forming treatment described in the after-mentioned "B. Method for producing composite active material 1. Coating layer forming step (1) First aspect", and the microparticle fixed layer is formed by the above-mentioned microparticle fixed layer forming treatment. The reason therefor is to allow the foundation coating layer and the microparticle fixed layer to be continuously formed out of a material of the same composition and allow the affinity between the foundation coating layer and the microparticle fixed layer to be favorable.

Incidentally, the composite active material having the coating layer of the present aspect may be such that the after-mentioned auxiliary coating layer is formed so as to previously coat the surface of the active material and the above-mentioned coating layer is formed on the auxiliary coating layer. The auxiliary coating layer allows the active material and the electrolyte material to be further restrained from reacting.

(2) Second Aspect

Figure 3:
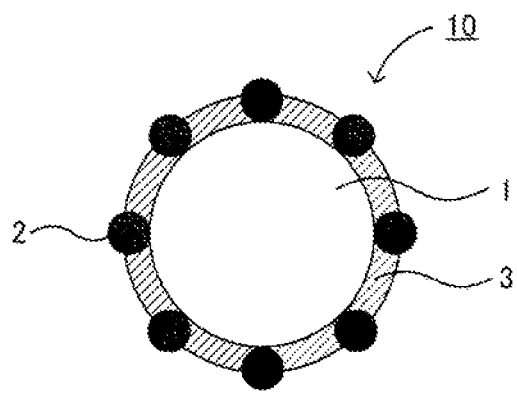
FIG. 3 is a schematic cross-sectional view showing another example of a composite active material of the present invention.

The second aspect of the coating layer in the present invention is an aspect such as to be a monolayer in which the microparticles contact with the active material. As shown in FIG. 3, the coating layer 3 is a monolayer in which the microparticles 2 contact with the active material 1. Incidentally, FIG. 3 is a schematic cross-sectional view showing an example of the composite active material having the coating layer of the second aspect, and reference numerals not described are the same as FIG. 1.

The microparticles in the present aspect contact with the active material, have a smaller particle diameter than the particle diameter of the active material, and contain Si. In the present aspect, since the microparticles are buried in the coating layer, the microparticles do not drop out of the coating layer even though force such as compression and shear is applied. Incidentally, the above-mentioned microparticles may be disposed so that at least a part thereof projects from the surface of the coating layer, or included inside the coating layer. The other points of the above-mentioned microparticles are the same as the microparticles in the above-mentioned first aspect; therefore, the description herein is omitted.

The coating layer of the present aspect is ordinarily the same as the microparticle fixed layer in the above-mentioned first aspect. Also, the coating layer may be formed on the whole surface of the active material, or formed on a part thereof; preferably, formed on the whole surface. The reason therefor is to allow the active material and the electrolyte material to be further restrained from reacting. Also, in the case where the above-mentioned coating layer is formed on a part of the surface of the active material, the after-mentioned auxiliary coating layer is preferably formed so as to coat the surface of the active material inside the above-mentioned coating layer.

The thickness of the coating layer of the present aspect is, for example, preferably within a range of 1 nm to 250 nm, and more preferably within a range of 3 nm to 50 nm. Incidentally, examples of a measuring method for the thickness of the coating layer include TEM.

Examples of a forming method for the coating layer of the present aspect include a method for performing a coating layer forming treatment described in the after-mentioned "B. Method for producing composite active material 1. Coating layer forming step (2) Second aspect".

Figure 4:
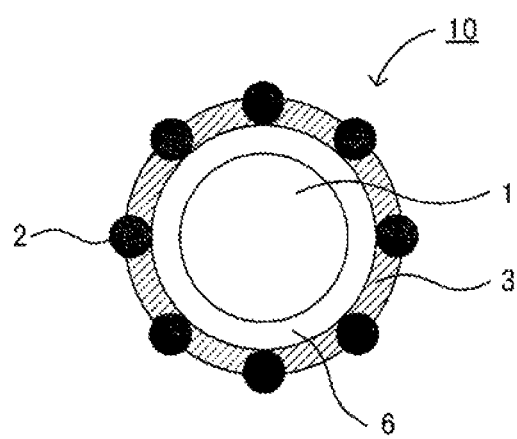
FIG. 4 is a schematic cross-sectional view showing another example of a composite active material of the present invention.

The composite active material having the coating layer of the present aspect, as exemplified in FIG. 4, is preferably such that an auxiliary coating layer 6 is formed so as to coat the surface of the active material 1 inside the coating layer 3. The reason therefor is that the auxiliary coating layer allows the active material and the electrolyte material to be further restrained from reacting. Also, the advantage that the range of material selection of a coating material extends is brought. The auxiliary coating layer is not particularly limited if the layer allows the active material and the electrolyte material to be restrained from reacting, but is preferably such as to have ion conductivity. The reason therefor is that the conduction of ions inside the auxiliary coating layer allows resistance on the surface of the active material to be decreased. Examples of a material for such an auxiliary coating layer include an ion conductive oxide. In the case where the composite active material having the coating layer of the present aspect is used for a lithium battery, the ion conductive oxide preferably has Li element, A element and O element. The above-mentioned A is not particularly limited but examples thereof include P, B, S, W, Mo, Zr, Al and Ti. In addition, specific examples of such an ion conductive oxide include $Li_3PO_4$, $Li_3BO_3$, $Li_2SO_4$, $LiBO_2$, $LiPO_3$, $LiWO_4$, $Li_2MoO_4$, $Li_2ZrO_3$, $Li_2AlO_3$, $Li_2TiO_3$, $Li_4Ti_5O_{12}$, LATP, LAGP and LiPON. Incidentally, FIG. 4 is a schematic cross-sectional view showing another example of the composite active material having the coating layer of the second aspect, and reference numerals not described are the same as FIG. 1.

The thickness of the auxiliary coating layer is, for example, preferably within a range of 1 nm to 10 nm. Also, the auxiliary coating layer preferably coats more areas of the surface of the active material, and more preferably coats the whole surface of the active material. Examples of a method for forming the auxiliary coating layer on the surface of the active material include a tumbling flow coating method, a mechano-fusion method, a CVD method and a PVD method.

2. Active Material

Next, the active material in the present invention is described. The active material in the present invention ordinarily reacts with the electrolyte material. Also, the above-mentioned active material varies with kinds of conductive ions of a battery for which the intended composite active material is used. For example, in the case where the composite active material of the present invention is used for a lithium secondary battery, the active material occludes and releases lithium ions. Also, the active material in the present invention may be a cathode active material or an anode active material.

The cathode active material used for the present invention is not particularly limited if the material reacts with the electrolyte material such as a sulfide solid electrolyte material. In the case where the composite active material of the present invention is used for a lithium battery, examples of the cathode active material to be used include an oxide cathode active material represented by a general formula $Li_xM_yO_z$ (M is a transition metallic element, x=0.02 to 2.2, y=1 to 2 and z=1.4 to 4). In the above-mentioned general formula, M is preferably at least one kind selected from the group consisting of Co, Mn, Ni, V and Fe, and more preferably at least one kind selected from the group consisting of Co, Ni and Mn. Specific examples of such an oxide cathode active material include rock salt bed type active materials such as $LiCoO_2$, $LiMnO_2$, $LiNiO_2$, $LiVO_2$ and $LiNi_{1/3}Co_{1/3}Mn_{1/3}O_2$, and spinel type active materials such as $LiMn_2O_4$ and $Li(Ni_{0.5}Mn_{1.5})O_4$. Also, examples of the oxide cathode active material except the above-mentioned general formula of $Li_xM_yO_z$ include olivine type active materials such as $LiFePO_4$ and $LiMnPO_4$. Also, Si-containing oxides such as $Li_2FeSiO_4$ and $Li_2MnSiO_4$ may be used as the cathode active material.

Examples of the shape of the cathode active material include a particulate shape, and preferably a perfectly spherical shape or an elliptically spherical shape, above all. Also, in the case where the cathode active material is in a particulate shape, the average particle diameter thereof is, for example, preferably within a range of 0.1 µm to 50 µm.

On the other hand, examples of the anode active material used for the present invention include $Nb_2O_5$, $Li_4Ti_5O_{12}$, $SiO_2$ and $SnO_2$.

Examples of the shape of the anode active material include a particulate shape, and preferably a perfectly spherical shape or an elliptically spherical shape, above all. Also, in the case where the anode active material is in a particulate shape, the average particle diameter thereof is, for example, preferably within a range of 0.1 µm to 50 µm.

3. Composite Active Material

The composite active material of the present invention is ordinarily used for a battery, and above all, preferably used for an all solid state battery. The reason therefor is that cracking and peeling of the coating layer for coating the surface of the active material are caused with such a difficulty in producing a battery that the coating layer allows a high-resistance layer to be sufficiently restrained from being formed at an interface between the active material and the solid electrolyte material such as a sulfide solid electrolyte material, and allows an all solid state battery excellent in output characteristics.

A method for producing the composite active material of the present invention is not particularly limited if the method is a method such as to allow the above-mentioned composite active material, but examples thereof include a method described in the after-mentioned "B. Method for producing composite active material".

B. Method for Producing Composite Active Material

Next, a method for producing a composite active material of the present invention is described. The method for producing a composite active material of the present invention comprises an active material and a coating layer for coating the surface of the above-mentioned active material, in which microparticles are disposed on the surface thereof, such that the above-mentioned microparticles have a smaller particle diameter than the particle diameter of the above-mentioned active material, and contain Si, characterized in that the method comprises a coating layer forming step of coating a coating liquid for forming a coating layer, containing Si, on the above-mentioned active material to form the above-mentioned coating layer.

The present invention allows the composite active material, which may restrain cracking and peeling of the coating layer by simple processes.

Figure 5:
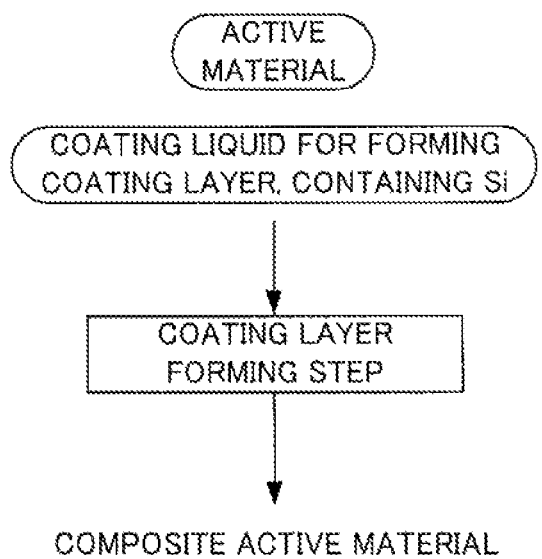
FIG. 5 is a flow chart showing an example of a method for producing a composite active material of the present invention.

FIG. 5 is a flow chart showing an example of the method for producing a composite active material of the present invention. In FIG. 5, first, the active material and the coating liquid for forming a coating layer, containing Si, are prepared. Next, the coating liquid for forming a coating layer, containing Si, is coated on the active material to form the coating layer for coating the surface of the active material, in which microparticles such as to have a smaller particle diameter than the particle diameter of the active material and to contain Si, are disposed on the surface thereof (coating layer forming step), and then obtain the composite active material.

1. Coating Layer Forming Step

The coating layer forming step in the present invention is a step of coating a coating liquid for forming a coating layer, containing Si, on the active material to form the coating layer. The above-mentioned coating layer forming step may be divided into two aspects of: an aspect such as to have a foundation coating layer forming treatment for coating the coating liquid for forming a coating layer after completing hydrolysis and before starting polymerization on the surface of the active material to form the foundation coating layer for coating the surface of the active material, containing Si, and a microparticle fixed layer forming treatment for coating the coating liquid for forming a coating layer after starting polymerization on the foundation coating layer to form the microparticle fixed layer for fixing the microparticles on the foundation coating layer, in which the microparticle fixed layer forming treatment is continuously performed after the foundation coating layer forming treatment (a first aspect); and an aspect such as to have a coating layer forming treatment for coating the coating liquid for forming a coating layer on the surface of the active material simultaneously with or after starting polymerization of the coating liquid for forming a coating layer to form the coating layer of a monolayer in which the microparticles contact with the active material (a second aspect). Each of the aspects is hereinafter described.

(1) First Aspect

The first aspect of the coating layer forming step in the present invention is an aspect such as to have a foundation coating layer forming treatment for coating the coating liquid for forming a coating layer after completing hydrolysis and before starting polymerization on the surface of the active material to form the foundation coating layer for coating the surface of the active material, containing Si, and a microparticle fixed layer forming treatment for coating the coating liquid for forming a coating layer after starting polymerization on the foundation coating layer to form the microparticle fixed layer for fixing the microparticles on the foundation coating layer, in which the microparticle fixed layer forming treatment is continuously performed after the foundation coating layer forming treatment. The coating layer forming step of the present aspect may form the coating layer having the foundation coating layer for coating the surface of the active material, containing Si, and the microparticle fixed layer for fixing the microparticles, formed on the foundation coating layer.

Figure 6:
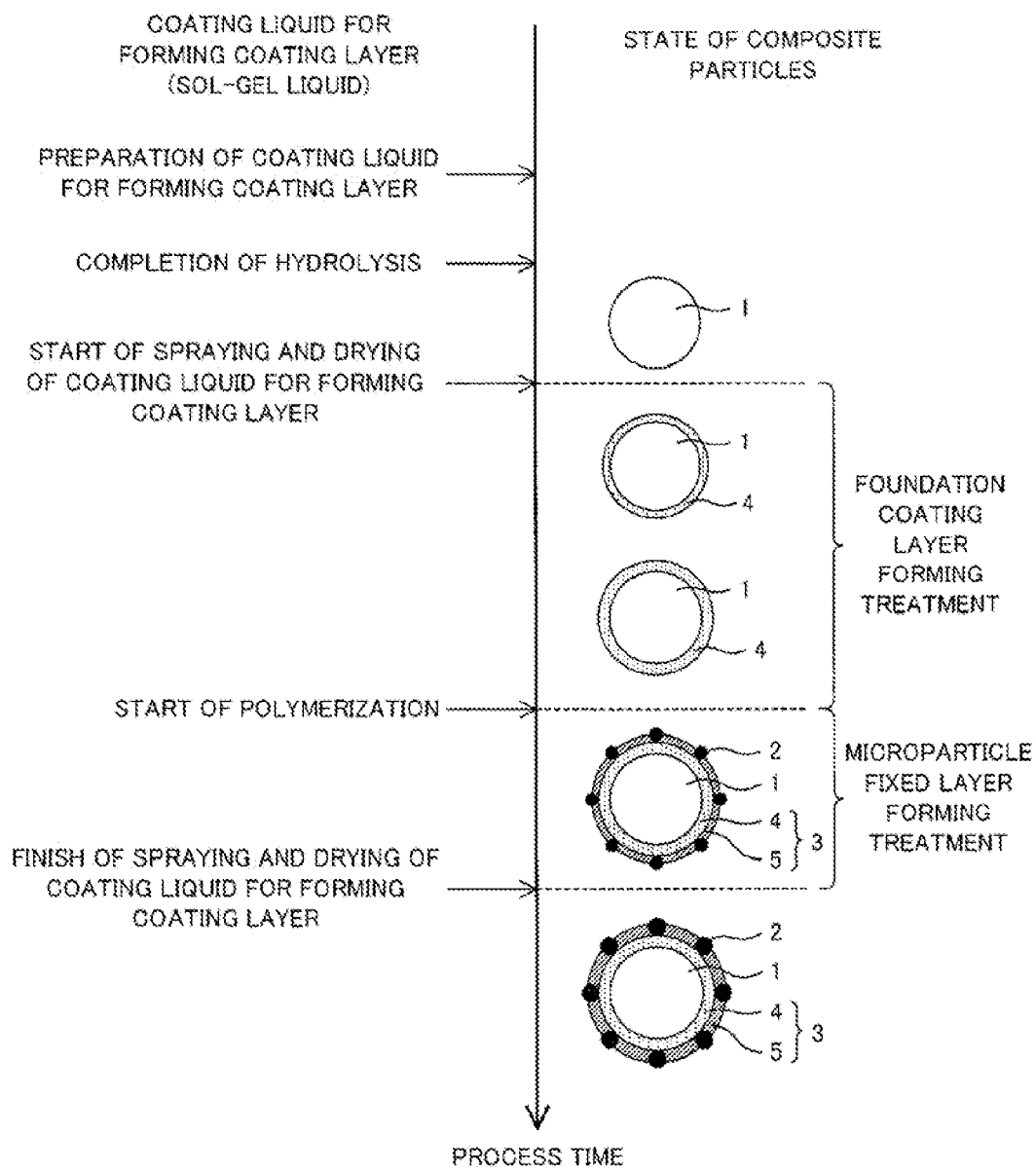
FIG. 6 is an explanatory view explaining an example of coating layer forming step in a method for producing a composite active material of the present invention.

FIG. 6 is an explanatory view explaining an example of the coating layer forming step of the first aspect. In FIG. 6, first, the coating liquid for forming a coating layer (sol-gel liquid) is prepared. Next, spraying and drying of the coating liquid for forming a coating layer on the surface of the active material 1 are started after completing hydrolysis and before starting polymerization of the coating liquid for forming a coating layer to form the foundation coating layer 4 for coating the surface of the active material 1, containing Si, in the time from the start of spraying and drying of the coating liquid for forming a coating layer to the start of polymerization of the coating liquid for forming a coating layer (the foundation coating layer forming treatment). In addition, spraying and drying of the coating liquid for forming a coating layer are continuously performed also after starting polymerization of the coating liquid for forming a coating layer, and spraying and drying of the coating liquid for forming a coating layer are finished after the passage of a predetermined time to form the microparticle fixed layer 5 for fixing the microparticles 2, formed on the foundation coating layer 4 in the time from the start of polymerization of the coating liquid for forming a coating layer to the finish of spraying and drying of the coating liquid for forming a coating layer (the microparticle fixed layer forming treatment), and then form the coating layer 3 having the foundation coating layer 4 and the microparticle fixed layer 5.

Figure 7:
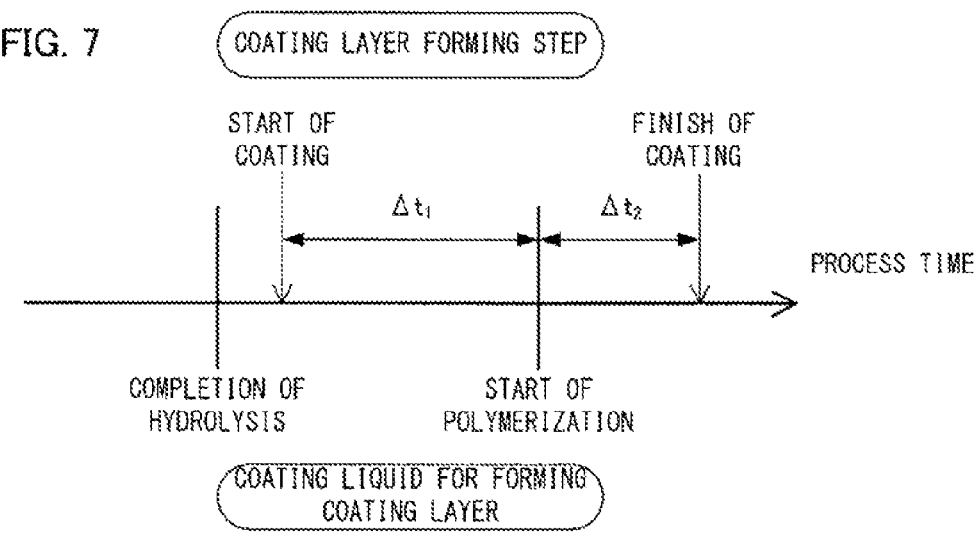
FIG. 7 is an explanatory view explaining a coating liquid for forming a coating layer in a method for producing a composite active material of the present invention.

The coating liquid for forming a coating layer (a sol-gel liquid) used for the present aspect ordinarily starts polymerization after completing hydrolysis. In the present aspect, as shown in FIG. 7, the adjustment of process time $\Delta t_1$ from the start of coating to the start of polymerization of the coating liquid for forming a coating layer and process time $\Delta t_2$ from the start of polymerization to the finish of coating of the coating liquid for forming a coating layer allows the desired coating layer to be easily formed by using a coating apparatus. For example, when $\Delta t_1$ is sufficiently increased, the foundation coating layer is formed; on the other hand, when $\Delta t_1$ is sufficiently decreased or the start of coating of the coating liquid for forming a coating layer becomes later than the start of polymerization, the foundation coating layer is not formed. Also, when $\Delta t_2$ is sufficiently increased, the microparticle fixed layer is formed; on the other hand, when $\Delta t_2$ is sufficiently decreased or the finish of coating of the coating liquid for forming a coating layer becomes earlier than the start of polymerization, the microparticle fixed layer is not formed. Incidentally, the formation of the microparticle fixed layer without forming the foundation coating layer allows the same as the coating layer of the after-mentioned second aspect to be formed.

Examples of a method for determining the completion of hydrolysis of the coating liquid for forming a coating layer include chemical analyses such as gas chromatography and infrared spectroscopic analysis, and physical methods such as viscoelasticity measurement and film forming ability evaluation on a substrate, for example, glass. When hydrolysis of the coating liquid for forming a coating layer is completed, it is conceived that Si alkoxide and a conductive ion source compound do not exist in a solvent to have a uniform composition. On the other hand, examples of a method for determining the start of polymerization of the coating liquid for forming a coating layer include a method for forming a film on a glass substrate out of the coating liquid for forming a coating layer to observe the film by an optical microscope or an electron microscope. When polymerization of the coating liquid for forming a coating layer is started, the microparticles containing Si are generated, so that a stage such that the microparticles are observed may be determined as the time when polymerization is started. In the present aspect, it is important to control the timing of the completion of hydrolysis and the start of polymerization for obtaining the desired coating layer. Examples of a method therefor include the modification of the concentration of Si alkoxide and a conductive ion source compound in the coating liquid for forming a coating layer and the water added amount during hydrolysis, and the adjustment of temperature of the coating liquid for forming a coating layer. In the case of adjusting temperature of the coating liquid for forming a coating layer, the timing of the completion of hydrolysis and the start of polymerization may be forecast at optional temperature by previously measuring the timing of the completion of hydrolysis and the start of polymerization at some temperatures to draw a calibration curve in accordance with Arrhenius equation.

The coating liquid for forming a coating layer used for the present aspect contains Si and is ordinarily a sol-gel liquid obtained by dissolving or uniformly dispersing Si alkoxide and a conductive ion source compound in a solvent. Examples of the Si alkoxide include tetraethoxysilane, tetramethoxysilane and tetrapropoxysilane. Also, examples of the conductive ion source compound include Li alkoxide such as lithium ethoxide and lithium methoxide, lithium acetate, and lithium hydroxide in the case where the conductive ion is an Li ion. On the other hand, examples of the solvent include ethanol. Also, examples of the active material used for the present aspect include the same as is described in the above-mentioned "A. Composite active material". In the present aspect, from the viewpoint of controllability of hydrolysis completion time and polymerization start time of the coating liquid for forming a coating layer, it is preferable to use tetraethoxysilane as the Si alkoxide and lithium acetate as the conductive ion source compound.

In the present aspect, the coating liquid for forming a coating layer after completing hydrolysis and before starting polymerization is coated on the surface of the active material in the foundation coating layer forming treatment, and the coating liquid for forming a coating layer after starting polymerization is coated on the foundation coating layer in the microparticle fixed layer forming treatment. A fluidized bed coating method is ordinarily used as a method for coating the coating liquid for forming a coating layer. The fluidized bed coating method is a technique for film coating by using a fluidized bed granulation coating apparatus, and allows uniform coating by repeating spraying and drying of the liquid on the particles. Examples of such an apparatus include a multiplex manufactured by Powrex Corp. and a flow coater manufactured by Freund Corporation. In the present aspect, with the use of the fluidized bed coating method, the foundation coating layer is formed without generating the microparticles by coating the coating liquid for forming a coating layer after completing hydrolysis and before starting polymerization on the surface of the active material, and the microparticle fixed layer is formed while generating the microparticles by coating the coating liquid for forming a coating layer after starting polymerization on the foundation coating layer.

Incidentally, whether the microparticle fixed layer is formed on the whole surface or the partial surface of the active material coated with the coating layer is conceived to depend on the rate of polymerization of the coating liquid for forming a coating layer. In the system of a fast rate of polymerization, the microparticle fixed layer is formed on the partial surface by reason of having so little time for forming a polymer that the whole surface may not be coated. On the other hand, in the system of a slow rate of polymerization, the microparticle fixed layer is formed on the whole surface by reason of having so enough time for forming a polymer that the whole surface may be coated.

The constitution and shape of the coating layer formed by the present aspect are the same as the contents described in the above-mentioned "A. Composite active material 1. Coating layer (1) First aspect"; therefore, the description herein is omitted.

(2) Second Aspect

The second aspect of the coating layer forming step in the present invention is an aspect such as to have a coating layer forming treatment for coating the coating liquid for forming a coating layer on the surface of the active material simultaneously with or after starting polymerization of the coating liquid for forming a coating layer to form the coating layer of a monolayer in which the microparticles contact with the active material. The coating layer forming step of the present aspect may form the coating layer of a monolayer in which the microparticles contact with the active material.

Figure 8:
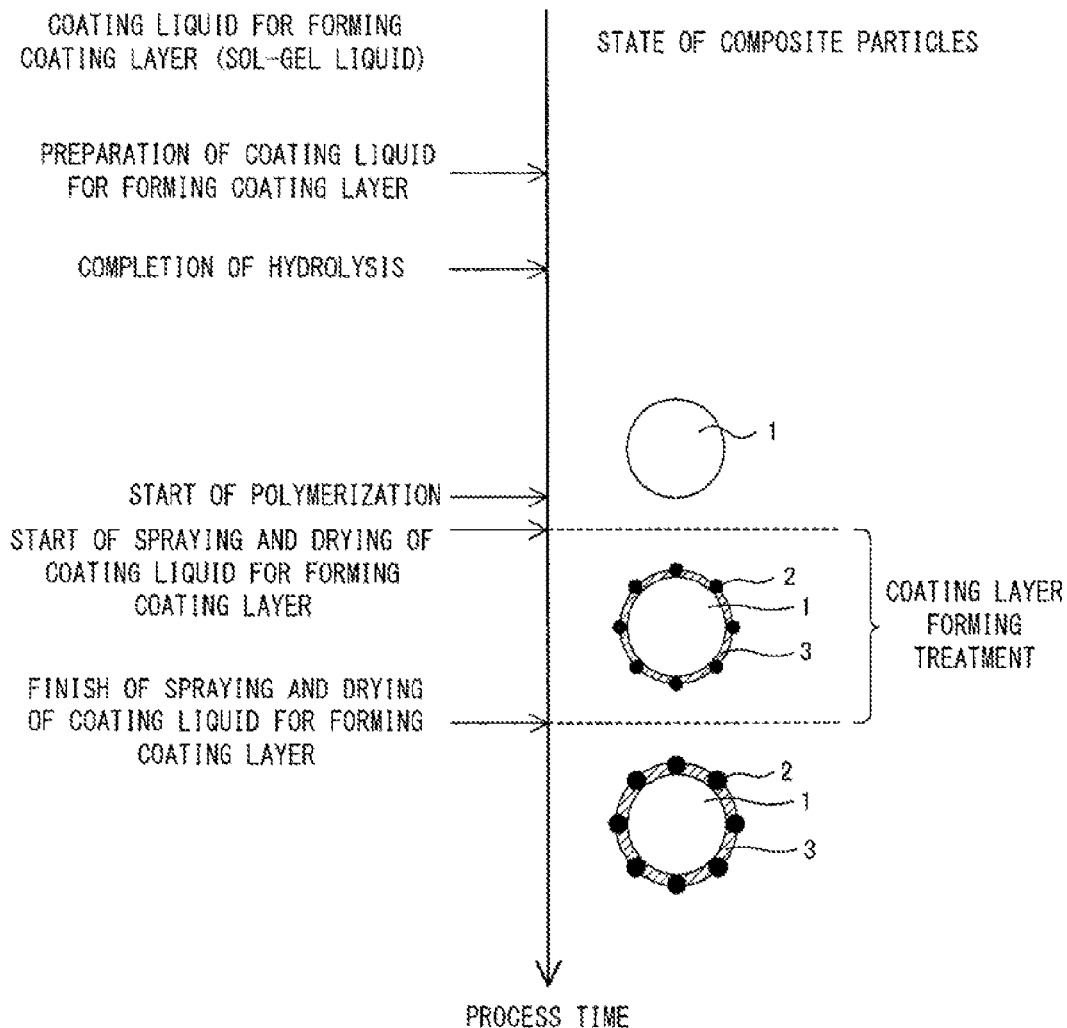
FIG. 8 is an explanatory view explaining another example of coating layer forming step in a method for producing a composite active material of the present invention.

FIG. 8 is an explanatory view explaining an example of the coating layer forming step of the second aspect. In FIG. 8, first, the coating liquid for forming a coating layer (sol-gel liquid) is prepared. Next, spraying and drying of the coating liquid for forming a coating layer on the surface of the active material 1 are started after starting polymerization of the coating liquid for forming a coating layer, and spraying and drying of the coating liquid for forming a coating layer are finished after the passage of a predetermined time to form the coating layer 3 as a monolayer in which the microparticles 2 contact with the active material 1 in the time from the start of spraying and drying to the finish of spraying and drying of the coating liquid for forming a coating layer (the coating layer forming treatment).

The coating liquid for forming a coating layer and the active material used for the present aspect are the same as the above-mentioned first aspect; therefore, the description herein is omitted. Also, in the present aspect, in the coating layer forming treatment, the coating liquid for forming a coating layer is coated on the surface of the active material simultaneously with or after starting polymerization of the coating liquid for forming a coating layer. A method for determining the start of polymerization and a method for coating the coating liquid for forming a coating layer are the same as the above-mentioned first aspect. In the present aspect, with the use of the fluidized bed coating method, the coating layer is formed while generating the microparticles by coating the coating liquid for forming a coating layer on the surface of the active material simultaneously with or after starting polymerization of the coating liquid for forming a coating layer.

The constitution and shape of the coating layer formed by the present aspect are the same as the contents described in the above-mentioned "A. Composite active material 1. Coating layer (2) Second aspect"; therefore, the description herein is omitted.

2. Composite Active Material

The uses of the composite active material obtained by the method for producing a composite active material of the present invention are the same as the contents described in the above-mentioned "A. Composite active material"; therefore, the description herein is omitted.

C. Battery

Next, a battery of the present invention is described. The battery of the present invention is a battery comprising a cathode active material layer containing a cathode active material, an anode active material layer containing an anode active material, and an electrolyte layer formed between the above-mentioned cathode active material layer and the above-mentioned anode active material layer, characterized in that at least one of the above-mentioned cathode active material layer and the above-mentioned anode active material layer contains the above-mentioned composite active material.

According to the present invention, the use of the above-mentioned composite active material allows the coating layer to be restrained from being cracked and peeled off the active material in producing the battery. As a result, the coating layer allows the active material and the electrolyte material to be restrained from reacting, and allows the battery excellent in output characteristics.

Figure 9:
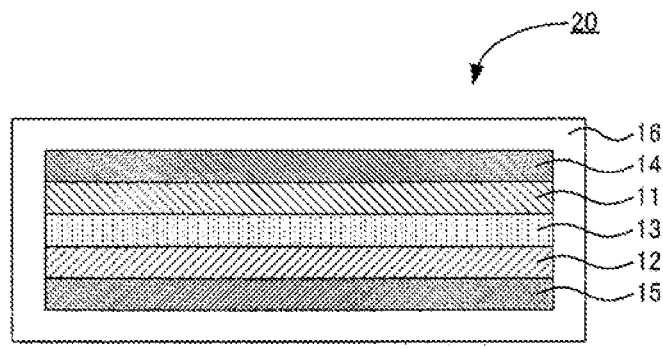
FIG. 9 is a schematic cross-sectional view showing an example of a battery of the present invention.

FIG. 9 is a schematic cross-sectional view showing an example of the battery of the present invention. A battery 20 shown in FIG. 9 comprises a cathode active material layer 11, an anode active material layer 12, an electrolyte layer 13 formed between the cathode active material layer 11 and the anode active material layer 12, a cathode current collector 14 for collecting currents from the cathode active material layer 11, an anode current collector 15 for collecting currents from the anode active material layer 12, and a battery case 16 for storing these members. The present invention is greatly characterized in that at least one of the cathode active material layer 11 and the anode active material layer 12 contains the above-mentioned composite active material.

The battery of the present invention is hereinafter described in each constitution.

1. Cathode Active Material Layer

First, the cathode active material layer in the present invention is described. The cathode active material layer in the present invention is a layer containing at least the cathode active material. Also, the cathode active material layer may contain at least one of a conductive material, a binder and a solid electrolyte material in addition to the cathode active material. In particular, in the case where the battery of the present invention is an all solid state battery comprising a solid electrolyte layer, the cathode active material layer preferably contains the solid electrolyte material. The reason therefor is that the solid electrolyte layer penetrates into the cathode active material layer with such a difficulty as compared with a liquid electrolyte layer (a liquid electrolyte) as to bring a possibility of deteriorating ion conductivity in the cathode active material layer. The addition of the solid electrolyte material allows ion conductivity of the cathode active material layer to be easily improved.

In the present invention, the cathode active material is preferably the above-mentioned composite active material. For example, the reason therefor is that the case where the cathode active material layer in the present invention contains a sulfide solid electrolyte material allows the effect of the present invention to be sufficiently performed. Also, in the case of using the above-mentioned composite active material for the anode active material, a general cathode active material may be used as the cathode active material. The content of the cathode active material in the cathode active material layer is, for example, preferably within a range of 10% by mass to 99% by mass, and more preferably within a range of 20% by mass to 90% by mass.

The conductive material is not particularly limited if the material has desired electron conductivity, but examples thereof include a carbon material. In addition, specific examples of the carbon material include acetylene black, Ketjen Black, carbon black, coke, carbon fiber and graphite. Also, the binder is not particularly limited if the binder is stable chemically and electrically, but examples thereof include fluorine-based binders such as polyvinylidene fluoride (PVDF) and polytetrafluoroethylene (PTFE), and rubber-based binders such as styrene-butadiene rubber. Also, the solid electrolyte material is not particularly limited if the material has desired ion conductivity, but examples thereof include an oxide solid electrolyte material and a sulfide solid electrolyte material. Incidentally, the solid electrolyte material is described in the after-mentioned "3. Electrolyte layer".

Also, the thickness of the cathode active material layer varies greatly with the constitution of a battery, and is preferably within a range of 0.1 µm to 1000 µm, for example.

2. Anode Active Material Layer

Next, the anode active material layer in the present invention is described. The anode active material layer in the present invention is a layer containing at least the anode active material. Also, the anode active material layer may contain at least one of a conductive material, a binder and a solid electrolyte material in addition to the anode active material. In particular, in the case where the battery of the present invention is an all solid state battery comprising a solid electrolyte layer, the anode active material layer preferably contains the solid electrolyte material. The reason therefor is that the solid electrolyte layer penetrates into the anode active material layer with such a difficulty as compared with a liquid electrolyte layer (a liquid electrolyte) as to bring a possibility of deteriorating ion conductivity in the anode active material layer. The addition of the solid electrolyte material allows ion conductivity of the anode active material layer to be easily improved.

The above-mentioned composite active material may be used as the anode active material used for the present invention. Also, in the case of using the above-mentioned composite active material for the cathode active material, examples of the anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon. Also, the content of the anode active material in the anode active material layer is, for example, preferably within a range of 10% by mass to 99% by mass, and more preferably within a range of 20% by mass to 90% by mass.

Incidentally, the conductive material, the binder and the solid electrolyte material used for the anode active material layer are the same as the above-mentioned case in the cathode active material layer. Also, the thickness of the anode active material layer varies greatly with the constitution of a battery, and is preferably within a range of 0.1 µm to 1000 µm, for example.

3. Electrolyte Layer

Next, the electrolyte layer in the present invention is described. The electrolyte layer in the present invention is a layer formed between the cathode active material layer and the anode active material layer and containing at least an electrolyte material. Ion conduction between a cathode active material and an anode active material is performed through the electrolyte material contained in the electrolyte layer. The form of the electrolyte layer is not particularly limited but examples thereof include a liquid electrolyte layer, a gel electrolyte layer and a solid electrolyte layer; and preferably a solid electrolyte layer, above all. The reason therefor is to allow a battery excellent in safety.

The solid electrolyte layer is a layer obtained by using the solid electrolyte material. Examples of the solid electrolyte material include an oxide solid electrolyte material and a sulfide solid electrolyte material. For example, in the case where the battery of the present invention is a lithium battery, the solid electrolyte material is preferably a sulfide solid electrolyte material. The reason therefor is to allow a high-output battery high in Li ion conductivity. Examples of the sulfide solid electrolyte material having Li ion conductivity include such as to have Li, S and the third component A. Examples of the third component A include at least one kind selected from the group consisting of P, Ge, B, Si, I, Al, Ga and As. Above all, in the present invention, the sulfide solid electrolyte material is preferably a compound using $Li_2S$ and a sulfide MS except $Li_2S$. Specific examples thereof include an $Li_2S$—$P_2S_5$ compound, an $Li_2S$—$SiS_2$ compound and an $Li_2S$—$GeS_2$ compound; and preferably an $Li_2S$—$P_2S_5$ compound, above all. The reason therefor is to be high in Li ion conductivity. Incidentally, "$Li_2S$—$P_2S_5$ compound" signifies the sulfide solid electrolyte material obtained by using a raw material composition containing $Li_2S$ and $P_2S_5$, and the other compounds signify similarly.

The content of the solid electrolyte material in the solid electrolyte layer is not particularly limited if the content is a ratio such as to allow desired insulating properties, but is preferably, for example, within a range of 10% by mass to 100% by mass, and above all, within a range of 50% by mass to 100% by mass. Also, the solid electrolyte layer may contain a binder. Incidentally, the binder used for the solid electrolyte layer is the same as the above-mentioned case in the cathode active material layer.

The liquid electrolyte layer is ordinarily a layer obtained by using a nonaqueous liquid electrolyte. Kinds of nonaqueous liquid electrolytes vary in accordance with kinds of batteries; for example, the nonaqueous liquid electrolyte of a lithium battery ordinarily contains a lithium salt and a nonaqueous solvent. Examples of the lithium salt include inorganic lithium salts such as $LiPF_6$, $LiBF_4$, $LiClO_4$ and $LiAsF_6$; and organic lithium salts such as $LiCF_3SO_3$, $LiN(CF_3SO_2)_2$, $LiN(C_2F_5SO_2)_2$ and $LiC(CF_3SO_2)_3$. Examples of the nonaqueous solvent include ethylene carbonate (EC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran, and mixtures thereof. The concentration of the lithium salt in the nonaqueous liquid electrolyte is, for example, within a range of 0.5 mol/L to 3 mol/L. Incidentally, in the present invention, a low-volatile liquid such as an ionic liquid may be used as the nonaqueous liquid electrolyte.

The gel electrolyte layer may be obtained by adding and gelating a polymer to a nonaqueous liquid electrolyte. Specifically, gelation may be performed by adding polymers such as polyethylene oxide (PEO), polyacrylonitrile (PAN) or polymethyl methacrylate (PMMA) to a nonaqueous liquid electrolyte.

The thickness of the electrolyte layer varies greatly with kinds of the electrolyte and constitutions of the battery, and is, for example, preferably within a range of 0.1 µm to 1000 µm, and more preferably within a range of 0.1 µm to 300 µm.

4. Other Constitutions

The battery of the present invention comprises at least the above-mentioned cathode active material layer, anode active material layer and solid electrolyte layer, ordinarily further comprising a cathode current collector for collecting currents from the cathode active material layer and an anode current collector for collecting currents from the anode active material layer. Examples of a material for the cathode current collector include SUS, aluminum, nickel, iron, titanium and carbon, and preferably SUS among them. On the other hand, examples of a material for the anode current collector include SUS, copper, nickel and carbon, and preferably SUS among them. Also, factors such as the thickness and shape of the cathode current collector and the anode current collector are preferably selected properly in accordance with uses of the battery.

The battery of the present invention may have a separator between the cathode active material layer and the anode active material layer. The reason therefor is to allow the battery with higher safety. Examples of a material for the separator include porous membranes such as polyethylene, polypropylene, cellulose and polyvinylidene fluoride; and nonwoven fabrics such as resin nonwoven fabric and glass fiber nonwoven fabric. Also, a battery case of a general battery may be used for a battery case used for the present invention. Examples of the battery case include a battery case made of SUS.

5. Battery

Examples of kinds of the battery of the present invention include a lithium battery, a sodium battery, a magnesium battery and a calcium battery; above all, preferably a lithium battery and a sodium battery, and particularly preferably a lithium battery. Also, the battery of the present invention may be a primary battery or a secondary battery, and preferably a secondary battery among them. The reason therefor is to be repeatedly charged and discharged and be useful as a car-mounted battery, for example. Examples of the shape of the battery of the present invention include a coin shape, a laminate shape, a cylindrical shape and a rectangular shape. Also, a producing method for the battery of the present invention is not particularly limited if the method is a method such as to allow the above-mentioned battery, but the same method as a producing method for a general battery may be used. In the case where the battery of the present invention is an all solid state battery, examples thereof include a method such that a material composing a cathode active material layer, a material composing an electrolyte layer (a solid electrolyte layer) and a material composing an anode active material layer are sequentially pressed to thereby produce a power generating element and this power generating element is stored inside a battery case, which is crimped.

Incidentally, the present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

A coating liquid for forming a coating layer was prepared by using boric acid, TEOS (tetraethoxysilane), lithium acetate and ethanol. First, boric acid and TEOS were each dissolved and uniformly decomposed in ethanol, and thereafter two solutions were mixed so that B and Si became 1:1 at element ratio (molar ratio), and continued to be stirred until uniformly mixed. Next, an ethanol solution of lithium acetate was prepared and mixed with the above-mentioned mixed solution containing B and Si so that the weight ratio of boric acid and lithium acetate became 2:23. In addition, the amount of ethanol was adjusted so that the solid content ratio of the solution became 6.4 wt % to obtain a coating liquid for forming a coating layer. Incidentally, the composition of the above-mentioned coating liquid for forming a coating layer may form $Li_4SiO_4$—$Li_3BO_3$. Incidentally, the use of boric acid allows a minor reaction to be restrained as compared with the case of using B alkoxide, and allows hydrolysis of TEOS to be easily controlled.

Subsequently, on the basis of the time when the ethanol solution of lithium acetate and the ethanol solution of boric acid and TEOS were mixed, spraying and drying of the above-mentioned coating liquid for forming a coating layer on the surface of an active material ($LiNi_{1/3}Co_{1/3}Mn_{1/3}O_2$, manufactured by Nichia Corporation) were started after the passage of 10 hours. Spraying and drying were finished after the passage of 9 hours from the start of spraying of the coating liquid for forming a coating layer to obtain a composite active material. On this occasion, 1610 g of the coating liquid for forming a coating layer was sprayed for 1 kg of the active material by using MP-01™ (manufactured by Powrex Corp.) for a coating apparatus. Incidentally, on the basis of the time when the ethanol solution of lithium acetate and the ethanol solution of boric acid and TEOS were mixed, hydrolysis of the above-mentioned coating liquid for forming a coating layer was completed after the passage of 10 hours, and polymerization of the above-mentioned coating liquid for forming a coating layer was started after the passage of 13 hours.

Figure 10:
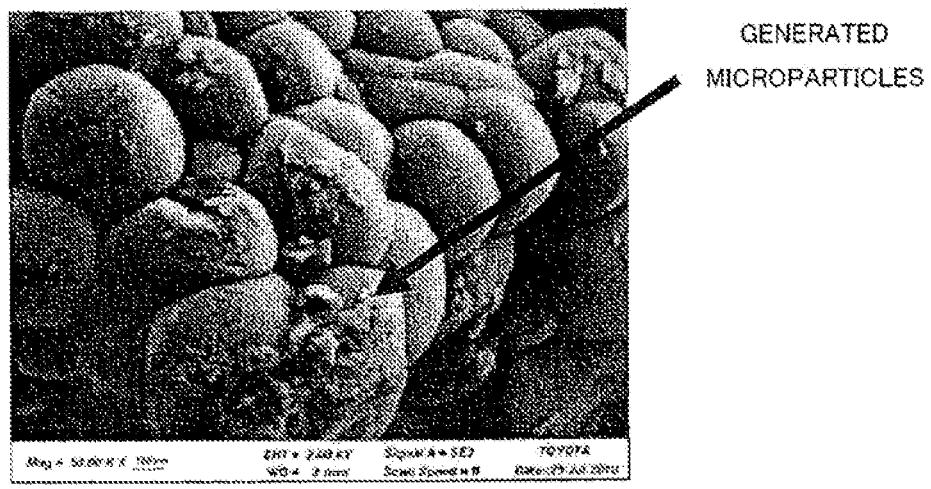
FIG. 10 is an SEM image of a composite active material obtained in Example 1.

The composite active material obtained in Example 1 was observed by a scanning electron microscope (SEM). An obtained SEM image is shown in FIG. 10. As shown in FIG. 10, it was confirmed that microparticles whose particle diameter was smaller than the active material were disposed on the surface of the active material.

Example 2

A composite active material was obtained in the same manner as Example 1 except that spraying and drying of the above-mentioned coating liquid for forming a coating layer on the surface of an active material ($LiNi_{1/3}Co_{1/3}Mn_{1/3}O_2$, manufactured by Nichia Corporation) were started after the passage of 15 hours, on the basis of the time when the ethanol solution of lithium acetate and the ethanol solution of boric acid and TEOS were mixed. When the composite active material obtained in Example 2 was observed by SEM, it was confirmed that microparticles whose particle diameter was smaller than the active material were disposed on the surface of the active material, similarly to Example 1.

REFERENCE SIGNS LIST

1 . . . active material
2 . . . microparticle
3 . . . coating layer
4 . . . foundation coating layer
5 . . . microparticle fixed layer
6 . . . auxiliary coating layer
10 . . . composite active material
11 . . . cathode active material layer
12 . . . anode active material layer
13 . . . electrolyte layer
14 . . . cathode current collector
15 . . . anode current collector
16 . . . battery case
20 . . . battery

The invention claimed is:

1. A composite active material comprising: an active material, a coating layer coating a surface of the active material and having ion conductivity, and a microparticle disposed such that the microparticle is buried in the coating layer and a part of the microparticle project from a surface of the coating layer,
wherein the microparticle has a smaller particle diameter than a particle diameter of the active material, and contains $SiO_2$, and
the coating layer contains $Li_4SiO_4$ and $Li_2SiO_3$.

2. The composite active material according to claim 1, wherein the coating layer has: a foundation coating layer coating the surface of the active material and contains $Li_4SiO_4$ and $Li_2SiO_3$; and a microparticle fixed layer for fixing the microparticle and continuously formed on the foundation coating layer.

3. The composite active material according to claim 1, wherein the coating layer is a monolayer in which the microparticle contacts with the active material.

4. A method for producing a composite active material, the composite active material being the composite active material according to claim 1,
the method comprises a coating layer forming step of coating a coating liquid for forming a coating layer, containing Si alkoxide, on the active material to form the coating layer and the micorparticle.

5. The method for producing a composite active material according to claim 4, wherein the coating layer forming step has:
a foundation coating layer forming treatment for coating the coating liquid for forming a coating layer after completing hydrolysis and before starting polymerization on the surface of the active material to form a foundation coating layer coating the surface of the active material, containing $Li_4SiO_4$ and $Li_2SiO_3$; and
a microparticle fixed layer forming treatment of coating the coating liquid for forming a coating layer after starting polymerization on the foundation coating layer to form a microparticle fixed layer fixing the microparticle on the foundation coating layer, in which the microparticle fixed layer forming treatment is continuously performed after the foundation coating layer forming treatment.

6. The method for producing a composite active material according to claim 4, wherein the coating layer forming step has a coating layer forming treatment of coating the coating liquid for forming a coating layer on the surface of the active material simultaneously with or after starting polymerization of the coating liquid for forming a coating layer to form the coating layer of a monolayer in which the microparticle contacts with the active material.

7. A battery comprising: a cathode active material layer containing a cathode active material, an anode active material layer containing an anode active material, and an electrolyte layer formed between the cathode active material layer and the anode active material layer,
wherein at least one of the cathode active material layer and the anode active material layer contains the composite active material according to claim 1.

\* \* \* \* \*